United States Patent [19]
Hoshino et al.

[11] Patent Number: 5,699,673
[45] Date of Patent: Dec. 23, 1997

[54] COMPRESSED DRY AIR SUPPLY SYSTEM

[75] Inventors: Tatsuyuki Hoshino; Takashi Ban; Takahisa Ban; Tatsuya Hirose, all of Kariya, Japan

[73] Assignee: Kabushiki Kaisha Toyoda Jidoshokki Seisakusho, Kariya, Japan

[21] Appl. No.: 660,724

[22] Filed: Jun. 10, 1996

Related U.S. Application Data

[63] Continuation of Ser. No. 362,657, Dec. 22, 1994, abandoned.

[30] Foreign Application Priority Data

Dec. 24, 1993 [JP] Japan ................. 5-328703

[51] Int. Cl.$^6$ ............... F04C 29/04; F04B 39/06
[52] U.S. Cl. ................. 62/93; 62/468; 62/272; 55/269
[58] Field of Search ................. 62/89, 93, 272, 62/285, 468; 418/DIG. 1; 55/267, 269

[56] References Cited

U.S. PATENT DOCUMENTS

| | | | |
|---|---|---|---|
| 3,785,755 | 1/1974 | Novak et al. | 62/93 |
| 3,967,466 | 7/1976 | Edwards | 62/402 |
| 4,070,166 | 1/1978 | Emmanuelsson . | |
| 4,088,426 | 5/1978 | Edwards | 418/8 |
| 4,242,110 | 12/1980 | Hynes | 55/269 |
| 4,505,128 | 3/1985 | Miller et al. | 62/272 |
| 4,905,476 | 3/1990 | Cinacchi | 62/93 |
| 5,171,130 | 12/1992 | Kume et al. . | |
| 5,199,271 | 4/1993 | Ewer | 62/84 |

FOREIGN PATENT DOCUMENTS

| | | |
|---|---|---|
| 2181469 | 4/1972 | France ........... 62/93 |
| 625343 | 2/1936 | Germany . |
| 2600488 | 7/1976 | Germany . |
| 2715610 | 10/1977 | Germany . |
| 2935145 | 3/1981 | Germany . |
| 3118967 | 12/1982 | Germany . |
| 3304722 | 7/1984 | Germany . |
| 3304722 | 2/1991 | Germany . |
| 60-35195 | 2/1985 | Japan . |
| 61-36798 | 10/1986 | Japan . |
| 1557296 | 12/1979 | United Kingdom . |

*Primary Examiner*—William Doerrler
*Attorney, Agent, or Firm*—Burgess, Ryan & Wayne

[57] ABSTRACT

A compressed dry air supply system includes an air compressor which uses water for lubricating and cooling the movable parts thereof. Compressed air obtained from the compressor is sufficiently dehumidified by a refrigerator type dryer. The water produced due to the dehumidification of the compressed air is received in a water tank, and some of the water held in the water tank is recycled back to the compressor.

8 Claims, 1 Drawing Sheet

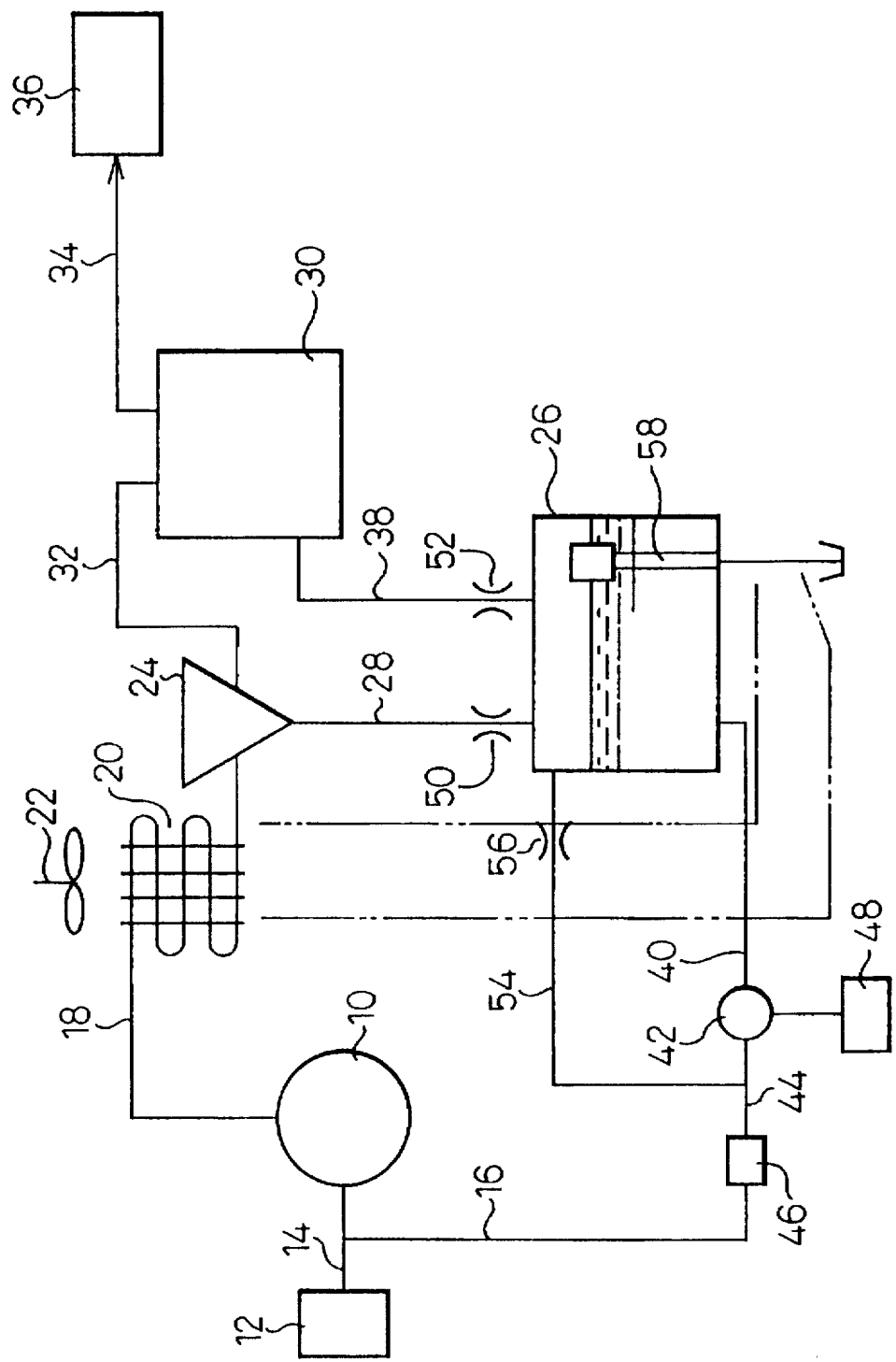

COMPRESSED DRY AIR SUPPLY SYSTEM

This application is a continuation of application Ser. No. 08/362,657, filed Dec. 22, 1994, now abandoned.

BACKGROUND OF THE INVENTION

1) Field of the Invention

The present invention relates to a compressed dry air supply system including an air compressor in which water is used as a cooling and lubricating medium for the movable parts of the air compressor.

2) Description of the Related Art

A compressed dry air supply system is used with a machine, such as an air-jet loom, in which a compressed and dehumidified air is needed. The compressed dry air supply system includes an air compressor into which air is introduced from the atmosphere and is compressed therein, and the compressed air discharged from the air compressor is fed to a dryer section to dehumidify the compressed air. The dryer section is provided with a mass of a hydroscopic agent, through which the compressed air is passed to dehumidify the compressed air. When the mass of hydroscopic agent is saturated with the absorbed moisture, the hydroscopic agent is recycled by passing compressed dry air through into the saturated mass of hydroscopic agent in the opposite direction or by heating it with a suitable heater. During the recycling of the mass of hydroscopic agent, the operation of the system must be interrupted.

An air compressor forming a part of the compressed dry air supply system includes various movable parts which must be sufficiently lubricated to prevent seizure of the movable parts, and which must be cooled because the movable parts are heated due to the adiabatic compression of air and due to the thermal energy produced by friction among the movable parts. In a compressed air supply system as shown in Unexamined Japanese Patent Publication No. 60(1985)-35196, an oil is used to lubricate and cool movable parts of a compressor included in this system, and compressed air discharged from the compressor is passed through an oil-separator in which oil drops are removed from the compressed air. Nevertheless, the compressed air discharged from the oil separator inevitably contains some oil as a fine oil mist. A compressed air containing oil is unacceptable in a machine such as the air-jet loom mentioned above.

Japanese Utility Model Publication No. 61(1958)-36798 discloses a compressed air supply system including an air compressor in which water is used as a cooling and lubricating medium for movable parts of the air compressor. In this system, the compressed air discharged from the air compressor contains fine water drops entrained therein, and is fed to an air tank having a water-separator by which the water drops are removed from the compressed air. Nevertheless, the compressed air obtained from the air tank is not necessarily dehumidified, and is very moist because it is saturated with water vapor. On the other hand, the water drops removed from the compressed air are accumulated in the air tank, and some of the accumulated water is successively returned to the air compressor for use as the lubricating and cooling medium for the movable parts of the air compressor. Nevertheless, a suitable amount of water must be periodically added to the system because a part of the water included in the system escapes therefrom as the water vapor in the compressed air discharged from the air tank and therefore from the system.

SUMMARY OF THE INVENTION

Therefore, an object of the present invention is to provide a compressed dry air supply system, including an air compressor, in which water is used as a lubricating and cooling medium for movable parts of the air compressor, which system is constituted such that the compressed air can be sufficiently dehumidified so that the addition of lubricating and cooling water to the system is unnecessary.

In accordance with an aspect of the present invention, there is provided a compressed dry air supply system comprising: an air compressor using water for lubricating and cooling the movable parts thereof; a refrigerator type dryer for dehumidifying a compressed air obtained from the air compressor; a water tank for receiving the water produced due to the dehumidification of the compressed air; and a recycling means for returning some of the water held in the water tank to the air compressor. The recycling means may include a conduit means provided between the water tank and the air compressor, and an upper space in the water tank is in communication with the conduit means to thereby prevent a rise in the air pressure in the upper space in the water tank. Preferably, the conduit means has a restrictor provided therein. Also, preferably, a conduit means is extended between the refrigerator type dryer and the water tank for feeding water from the refrigerator type dryer to the water tank, and has a restrictor provided therein. The water tank may be provided with an automatic drainage device for preventing a level of the water held therein from exceeding a given level.

In accordance with another aspect of the present invention, there is provided a compressed dry air supply system comprising: an air compressor using water for lubricating and cooling the movable parts thereof; a radiator for partially cooling the compressed air obtained from the air compressor; a water separator for removing water drops from the compressed air obtained from the radiator; a refrigerator type dryer for dehumidifying a compressed air obtained from the water separator; a water tank for receiving the water produced due to the removal of water from the compressed air by the water separator and the water produced due to the dehumidification of the compressed air by the refrigerator type dryer; and a recycling means for returning some of the water held in the water tank to the air compressor. The recycling means may include a conduit means provided between the water tank and the air compressor, and an upper space of the water tank is in communication with the conduit means to thereby prevent a rise in the air pressure in the upper space in the water tank. Preferably, the conduit means has a restrictor provided therein. Also, preferably, a conduit means is extended between the water separator and the water tank for feeding the water from the water separator to the water tank, and has a restrictor provided therein, and a conduit means is extended between the refrigerator type dryer and the water tank for feeding the water from the refrigerator type dryer to the water tank, and has a restrictor provided therein. The water tank may be provided with an automatic drainage device for preventing a level of the water held therein from exceeding a given level. Preferably, the radiator is provided with a fan so as to subject the radiatior to an air flow produced by the fan, and the air flow produced by the fan and passed through the radiator is directed onto water draining from the water tank, whereby the water drained by the drainage device can be quickly evaporated into atmosphere.

BRIEF DESCRIPTION OF THE DRAWINGS

Other objects and advantages of the present invention will be better understood from the following description, with reference to the accompanying drawing.

The drawing is a block diagram of a compressed dry air supply system according to the present invention.

DESCRIPTION OF THE PREFERRED EMBODIMENTS

In the drawing, reference numeral 10 indicates an air compressor which may be a scroll type compressor, and which is operationally connected to a drive source such as an electric motor (not shown). The compressor 10 is connected to an air filter 12 through a suction conduit 14, and an air is introduced from the atmosphere into the compressor 10 through the air filter 12 and the conduit 14. A water-feeding conduit 16 is joined to the conduit 14, and water is fed from the conduit 16 into the air-stream passing through the conduit 14 so that the water is introduced together with the air into the compressor.

A discharge conduit 18 is extended from the compressor 10 to a radiator 20, and compressed air produced by the compressor 10 is fed to the radiator 20 through the conduit 18. The compressed air has a relatively high temperature due to the adiabatic compression of the air and due to the thermal energy produced by friction between the movable parts of the compressor 10, but it is suitably cooled by the radiator 20. As illustrated, preferably, the radiator 20 is provided with a cooling fan 22 so that the heat can be effectively removed from the radiator 20.

Then, the compressed air cooled by the radiator 20 is introduced into a well-known water separator 24 in which the water drops entrained with the compressed air are removed therefrom. Nevertheless, the compressed air from which the water drops are removed is very moist because it is saturated with water vapor. The water drops removed from the compressed air are fed to a water tank 26 through a conduit 28, and are accumulated therein.

The compressed air from which the water drops are removed is fed to a refrigerator type dryer 30 through a conduit 32 extended therebetween. The dryer 30 includes various well-known elements for establishing a refrigerating cycle, and these elements includes a compressor, a condenser, an expansion valve and an evaporator. The compressed air fed to the dryer 30 passes through a refrigerating zone which is formed and defined by the evaporator, and is thus rapidly chilled such that the saturated water vapor included therein is condensed as water drops, whereby the compressed air can be sufficiently dehumidified. The dryer 30 has a discharge conduit 34 extended therefrom, and is connected to a machine such as an air-jet loom 36. Namely, the air-jet loom 36 can be supplied with compressed and dehumidified air from the dryer 30 through the conduit 34. On the other hand, the water drops condensed in the refrigerating zone of the dryer 30 are fed to the water tank 26 through a conduit 38, are accumulated therein. Note, since the compressed air to be fed is partially dehumidified by the water separator 24, the capacity of the dryer 30 can be made small.

As illustrated, a conduit 40 is extended from a bottom of the water tank 26 to a solenoid valve 42, and then a conduit 44 is extended from the solenoid valve 42 and is connected to the water-feeding conduit 16 through a filter 46. The solenoid valve 42 is electrically connected to a timer controller 48 such that the solenoid valve 42 is periodically opened. Namely, a part of the water accumulated in the water tank 26 is periodically fed to the compressor 10.

The conduits 28 and 38 have restrictors 50 and 52 provided therein, respectively, and an upper space in the water tank 26 is in communication with the conduit 44 through a conduit 54 having a restrictor 56 provided therein. Thus, a rise in the air pressure in the upper space of the water tank 26 is suppressed so that the return of moist and wet air from that upper space to the water separator 24 and the dryer 30 can be prevented.

The air introduced from atmosphere into the compressor 10 contains water as water vapor, and this water is also removed from the compressed air by the dryer 30, so that the amount of the water accumulated in the water tank 26 is gradually increased. For this reason, the water tank 26 is provided with a well-known automatic drainage device 58 incorporated therein, so that a level of the water held in the water tank 26 cannot exceed a given level. Preferably, the air flow produced by the fan 22 and passed through the radiator 20 is directed onto the water draining from the water tank 26, as indicated by chain-dot lines in the drawing, whereby the draining water can be quickly evaporated into the atmosphere. Of course, in this case, a provision of piping for the water draining from the water tank 26 is unnecessary. Also, a size of the water tank 26 can be made small due to the automatic drainage device 58.

As is apparent from the foregoing, the compressed air discharged from the system according to the present invention is sufficiently dehumidified by the refrigerator type dryer 30, and thus an escape of water out of the system is substantially prevented. Accordingly, the system according to the present invention can be installed regardless of a location of a water service. Note, a conventional system, as disclosed in Japanese Utility Model Publication No. 61(1958)-36798, must be installed a location beside a water service because a suitable amount of water must be periodically added to the system.

Finally, it will be understood by persons skilled in the art that the foregoing description is of preferred embodiments of the present invention, and that various changes and modifications can be made without departing from the spirit and scope thereof.

We claim:

1. A compressed dry air supply system comprising:
   an air compressor using water for lubricating and cooling movable parts thereof;
   a radiator for partially cooling the compressed air obtained from said air compressor;
   a water separator for removing water drops from the compressed air obtained from said radiator;
   a refrigerator type dryer for dehumidifying the compressed air obtained from said water separator;
   a water tank for receiving the water removed from the compressed air by said water separator and the water produced by the dehumidification of the compressed air by said refrigerator type dryer; and
   a recycling means for returning at least part of the water held in said water tank to said air compressor.

2. The compressed dry air supply system as set forth in claim 1, wherein a conduit means having a restictor, is extended between said refrigerator type dryer and said water tank, for feeding the water from said refrigerator type dryer to said water tank.

3. The compressed dry air supply system as set forth in claim 1, wherein said recycling means includes a conduit means provided between said water in the water tank and said air compressor, having a flow control means therein wherein said conduit means is in communication with a space above the level of water in said water tank and with a portion of the conduit means downstream of the flow control means to thereby prevent a rise in the pressure of the air in the upper space in said water tank.

4. The compressed dry air supply system as set forth in claim 3, wherein said conduit means has a restrictor provided therein.

5. The compressed dry air supply system as set forth in claim 1, wherein a first conduit means having a restrictor is extended between said water separator and said water tank, for feeding the water from said water separator to said water tank and wherein a second conduit means having a restrictor therein is extended between said refrigerator type dryer and said water tank, for feeding the water from said refrigerator type dryer to said water tank.

6. The compressed dry air supply system as set forth in claim 1, wherein said water tank is provided with an automatic level control drainage device for preventing the level of the water held therein from exceeding a given level.

7. The compressed dry air supply system as set forth in claim 6, wherein said radiator is provided with a fan so that the radiator is subjected to an air flow produced by said fan, and the air flow produced by said fan which has passed through said radiator is directed onto water draining from said water tank, whereby the water drained by said drainage device is quickly evaporated into the atmosphere.

8. The compressed dry air supply system as set forth in claim 1, wherein the refrigerator type dryer includes a compressor, a condenser, an expansion valve and an evaporator.

* * * * *